(12) United States Patent
Kim

(10) Patent No.: US 8,741,478 B2
(45) Date of Patent: *Jun. 3, 2014

(54) POUCH-TYPE RECHARGEABLE BATTERY AND ITS METHOD OF MANUFACTURE

(71) Applicant: Samsung SDI Co., Ltd., Yongin (KR)

(72) Inventor: Kwangsup Kim, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/952,177

(22) Filed: Jul. 26, 2013

(65) Prior Publication Data

US 2013/0309558 A1 Nov. 21, 2013

Related U.S. Application Data

(63) Continuation of application No. 12/076,543, filed on Mar. 19, 2008, now Pat. No. 8,524,392.

(30) Foreign Application Priority Data

Apr. 2, 2007 (KR) .................. 10-2007-0032472

(51) Int. Cl.
*H01M 2/08* (2006.01)
(52) U.S. Cl.
USPC ...................... 429/185; 429/179; 429/181

(58) Field of Classification Search
USPC .................................... 429/121–347
See application file for complete search history.

(56) References Cited

U.S. PATENT DOCUMENTS

2003/0148173 A1 8/2003 Gu
2005/0084749 A1 4/2005 Hwang et al.

FOREIGN PATENT DOCUMENTS

| JP | 10302756 | 11/1998 |
| JP | 2000223083 | 8/2000 |
| JP | 2005-353503 | 12/2005 |
| KR | 100216871 | 6/1999 |
| KR | 1020020023486 | 3/2002 |
| KR | 1020030034738 | 5/2003 |
| KR | 1020040110156 | 12/2004 |
| KR | 1020060034508 | 4/2006 |

*Primary Examiner* — Kenneth Douyette
*Assistant Examiner* — James Lee
(74) *Attorney, Agent, or Firm* — Robert E. Bushnell, Esq.

(57) ABSTRACT

A pouch-type rechargeable battery and its method of manufacture includes: an electrode assembly having a resin layer attached to the outer surface of an electrode tap, and a pouch having a sealing part formed on the ends of the top and bottom thereof, housing the electrode assembly. The resin layer is positioned inside the sealing part and sealed by heat and pressure for preventing it from being exposed outside the sealing part. Thus, the pouch-type rechargeable battery is adapted to seal the resin layer in the sealing part, instead of exposing it outside the sealing part so as to reduce the longitudinal length of the battery, thereby improving the capacity of the battery.

10 Claims, 7 Drawing Sheets

POUCH-TYPE RECHARGEABLE BATTERY AND ITS METHOD OF MANUFACTURE

CLAIM OF PRIORITY

This application makes reference to, incorporates the same herein, and claims all benefits accruing under 35 U.S.C. §119 from an application for POUCH-TYPE RECHARGEABLE BATTERY AND METHOD OF MANUFACTURING THE SAME earlier filed in the Korean Intellectual Property Office on the 2 of Apr. 2007 and there duly assigned Ser. No. 10-2007-0032472, and under 35 U.S.C. §120 as a continuation of an application entitled POUCH-TYPE RECHARGEABLE BATTERY AND METHOD OF MANUFACTURING THE SAME earlier filed in the U.S. Patent & Trademark Office on the 19 of Mar. 2008 and there duly assigned Ser. No. 12/076,543.

BACKGROUND OF THE INVENTION

1. Field of the Invention

The present invention relates to a pouch-type rechargeable battery and its method of manufacture, and more particularly, the present invention relates to a pouch-type rechargeable battery using a pouch as an external case in housing an electrode assembly.

2. Description of Related Art

In general, a lithium rechargeable battery uses a non-aqueous electrolyte due to the reactivity of lithium with water. The non-aqueous electrolyte may be a solid polymer containing a lithium salt or a liquid in which of a lithium salt is dissociated in an organic solvent. Lithium rechargeable batteries can be classified into lithium metal batteries and lithium ion batteries, which use liquid electrolytes, and lithium ion polymer batteries which uses a polymer electrolyte, depending upon the types of electrolyte.

A problem of leakage of a lithium ion polymer battery, in comparison with a lithium ion battery using liquid electrolytes, does not occur. Accordingly, the lithium ion polymer battery can use a multi-layered pouch including a metal foil and one or more polymer membranes covering the top and bottom surfaces of the metal foil instead of a metal can used in the lithium ion battery.

When the multi-layered pouch uses lithium rechargeable batteries, it is possible to reduce the weight and thickness of the battery, and to relatively freely change the shape of the battery, as compared with a battery in which a metal can is used.

The conventional pouch for a lithium ion polymer battery has a multi-layered structure by sequentially stacking a polyolefin resin layer, a thermal adhesive layer, which acts as a sealing material with a thermal adhesive property, a metal foil layer, such as aluminum or the like maintaining mechanical strength, and a nylon layer which act as a protection layer. CPP (Casted Polypropylene) is normally used as the polyolefin resin layer.

In a general method of assembling a pouch-type lithium rechargeable battery, a middle portion of a rectangular pouch membrane is folded to form the top and bottom of the pouch. A drawing part, which can receive an electrode assembly or the like, is formed by a press processing in the bottom of the pouch. The formed drawing part makes it easy to install the electrode assembly in the post-processes, thereby making it easy to form a flange on the flange part of the pouch on the basis of the drawing part, and the flange part forms a sealing part in the following sealing processes. In addition, the sealing part can be folded and arranged, thereby compactly forming the pouch.

An electrode assembly, which is formed by sequentially stacking a positive electrode plate, the first separator, a negative electrode plate, and the second separator, is wound in a spiral form to be formed as a jelly roll. The formed jelly roll is disposed in the drawing part of the bottom of the pouch. The flange part, which has a shape of a flange, is heated and pressed to form a bare cell of a battery while the flange parts of the top and bottom of the pouch are brought into tight contact with each other.

In order to electrically connect a positive electrode plate and a negative electrode plate of an electrode assembly to outside of the pouch, electrode taps are formed on one side of each of a positive electrode plate and a negative electrode plate. These electrode taps are formed to be projected from the jelly roll in a direction perpendicular to the winding direction of the jelly roll and are drawn out through one side of the pouch to be sealed.

Accessories or structures, such as a Protective Circuit Module (PCM) or a Positive Temperature Coefficient (PTC) element, are attached to the bare cell, of which the pouch has been sealed, to form a core cell. Thereafter, the core cell is inserted and combined into a hard case to form a hard pack.

In the end of the flange part of the pouch, a metal foil constituting the middle layer of a pouch membrane has been exposed. Accordingly, when the Protective Circuit Module is combined with the pouch-type bare cell, the conductive part of the Protective Circuit Module is very likely to be electrically connected to the exposed metal foil. If the conductive part of the Protective Circuit Module is directly or indirectly connected to the electrode of the bare cell, it is more likely that the electrode and the metal foil of the pouch membrane are electrically connected.

Erosion of the metal foil of the pouch membrane, which is made of aluminum or the like by an electrical and chemical action, can occur if the metal foil of the pouch membrane is electrically connected to the electrode. In particular, if electrolyte ingredients or humidity exist around the electrode taps of the pouch, the erosion of the metal foil is accelerated.

Since the metal foil, which acts as a barrier between water and oxygen, is continually eroding, only a polymer layer of the pouch membrane is not enough to block the inflow of water and oxygen. In addition, as exterior water or oxygen flows therein, abnormal phenomenon, such as swelling, occurs to cause abandonment, performance degradation of the battery, and shortened life time of the battery.

In the process of sealing the pouch, a predetermined ingredient may be added to a surface of a polymer layer for reinforcing the bonding between the polymer layer, such as CPP, inside the pouch and a metal including the electrode tap. In addition, a resin insulation layer, such as an insulation tape, may be further attached to the electrode tap for preventing an occurrence of a short circuit between the electrode tap and the metal foil of the pouch.

Contemporary designs for pouch-type rechargeable batteries tend to ineffectively utilize the space and capacity of the batteries, and thus suffer from reduced charging and discharging capacity, with an accompanying reduction in capacity-to-volume, or capacity-to-width ratio.

SUMMARY OF THE INVENTION

The present invention has been made to solve the above-mentioned problems, and an object of the present invention is to provide a pouch-type rechargeable battery including a shorter structure using a resin layer on an electrode tap, and to improve the capacity-to-volume or width ratio of the battery.

A pouch-type rechargeable battery according to the present invention includes an electrode assembly having a resin layer formed on a surface portion of the electrode tap, and a pouch having a sealing part formed on one end thereof, housing the electrode assembly, to expose the electrode tap outside the pouch through the sealing part. The resin layer does not extend beyond a straight line crossing the electrode tap and passing the front end of the pouch.

A groove can be formed on the region corresponding to the resin layer of the sealing part so as to expose a portion of the resin layer. The groove has an outline in one end of the pouch formed concavely at positions set apart from the straight line. The distance, in which the groove is set apart from the straight line, is greater than that of the exposed portion of the resin layer.

In the sealing part, one end of a pouch membrane is folded inside (inner space) the pouch along a folding line, and the sides opposed to each other, of the folded pouch membrane, that is, the outer surfaces opposed to each other, of the top and bottom of the pouch, are sealed. The folding line, which is a boundary of the folding part, constitutes the front end of the sealing part or the front end of the pouch.

The pouch membrane can have a layered structure including an insulation layer covering a metal foil layer and the top and bottom surfaces of the metal foil layer. Then, the insulation layer covering the metal foil layer can be made of a material which melts between 90° C. and 160° C. The insulation layer covering the top and bottom surfaces of the metal foil can be made of, for example, a polyolefin resin layer, CPP (Casted Polypropylene).

According to the present invention, a method of manufacturing a pouch-type rechargeable battery is provided, the method including: manufacturing an electrode assembly including a resin layer formed on a surface portion of an electrode tap; arranging ends of a top and bottom of a pouch on a top and bottom of the resin layer to be overlapped with at least a portion of the resin layer, the top and bottom of the pouch being arranged in the opposite direction to the electrode assembly with which the resin layer is formed; forming a sealing part by heating the ends of the top and bottom of the pouch; bending the top and bottom of the pouch toward the electrode assembly along the sealing part to expose an end of the electrode tap and to cover the electrode assembly with the top and bottom of the pouch; and sealing an opening flange part of the top and bottom of the pouch.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 6:
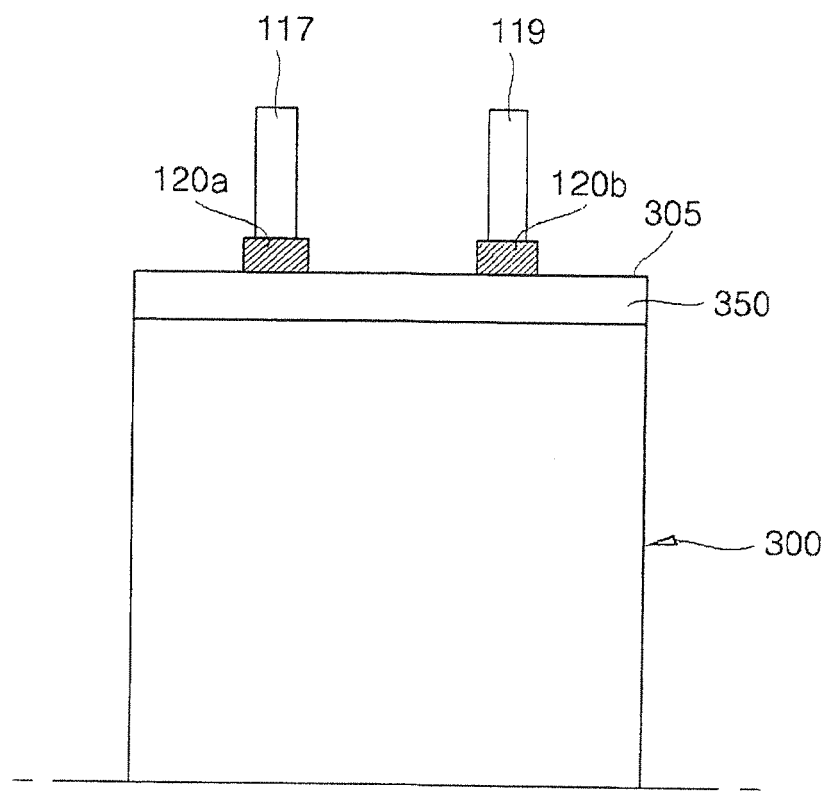
FIG. 6 is a front view of a pouch-type rechargeable battery.

Turning now to the drawings and first to FIG. 6, a pouch-type rechargeable battery is illustrated with insulation tapes 120a and 120b attached to electrode taps 117 and 119, portions of the insulation tapes 120a and 120b are sealed by heating and pressing inside the sealing part 350 formed on one end of pouch 300, and other portions of insulation tapes 120a and 120b are exposed outside sealing part 350. Insulation tapes 120a and 120b are exposed outside the sealing part 350, when electrode taps 117 and 119 are bent along a front end 305 of pouch 300 and connected to a Protective Circuit Module (not shown). This prevents electrode taps 117 and 119 from contacting a metal foil exposed outside of front end 305 of the pouch and electrically connected to each other.

In this process of bending the electrode taps however, the electrode taps are not bent exactly along the front end of the pouch, but they are bent in the front ends of insulation tapes 120a and 120b due to the effect of insulation tapes 120a and 120b. Accordingly, the length of the pouch-type rechargeable battery becomes longer as the length from front end 305 of pouch 300 to the front end of insulation tapes 120a and 120b.

As a result, this concomitant lengthening of the pouch-type rechargeable battery undesirable reduces the capacity (charging and discharging capacity)-to-volume or width ratio of the pouch-type battery. Accordingly, a reduction in the length from the front end to the rear end of the pouch-type rechargeable battery is needed to enhance the utilization of space and the capacity of the battery.

Hereinafter, exemplary embodiments of the present invention are described in detail with reference to accompanying drawings, in which like reference numerals denote like elements.

An exemplary embodiment of a pouch-type rechargeable battery according to the present invention includes an electrode assembly 10, and a pouch having its top 30 and bottom 40 which are sealed, housing the electrode assembly 10 therein.

Figure 1:
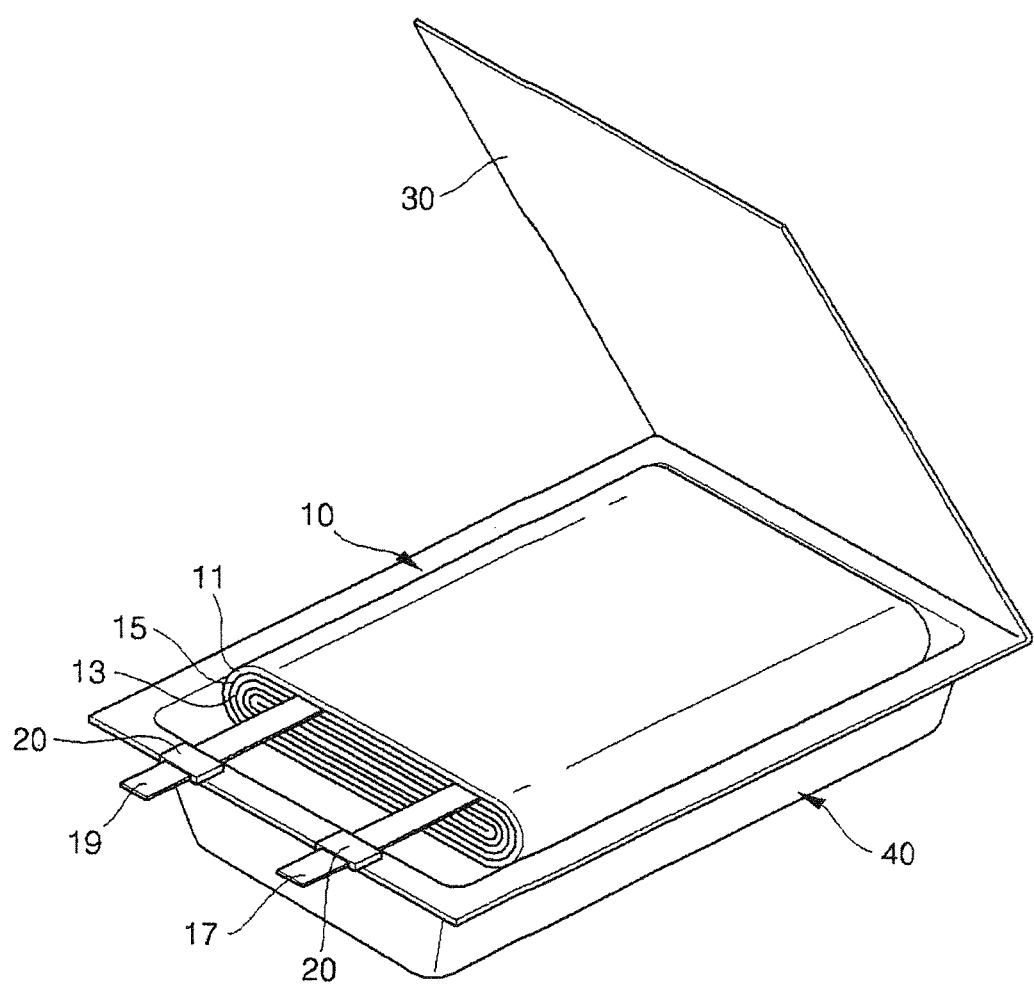
FIG. 1 is a perspective view of an electrode assembly according to an embodiment of the present invention.

As shown in FIG. 1, although it is not shown in detail, the electrode assembly 10, formed by sequentially stacking a positive electrode plate 11 and a negative electrode plate 13, formed by an electrode collector including a metal grid or thin-film, charged or coated with an electrode active material, and a separator 15 interposed between the positive electrode plate 11 and the negative electrode plate 13, and wound to form a jelly roll configuration.

On one side of each of the positive electrode plate 11 and the negative electrode plate 13, a positive electrode tap 17 and a negative electrode tap 19 are respectively formed as electrode taps so as to be electrically connected to electrical connections outside of the pouch. In addition, the positive electrode tap 17 and the negative electrode tap 19 are spaced apart in parallel.

A resin layer 20 is formed on surface portions of the positive electrode tap 17 and the negative electrode tap 19. In the post-processes, the resin layer 20 is interposed between the bonding sides which the electrode taps and the top 30 and bottom 40 of the pouch meeting in a sealing part formed in one end of the pouch, to improve the coherence between the electrode taps and the pouch, thereby reinforcing sealing of the pouch. The resin layer 20 prevents a metal foil layer and the electrode taps from being electrically connected to each other in the sealing part of the pouch. The resin layer 20 can be made of an insulation tape with a thermal adhesive property.

Figure 2A:
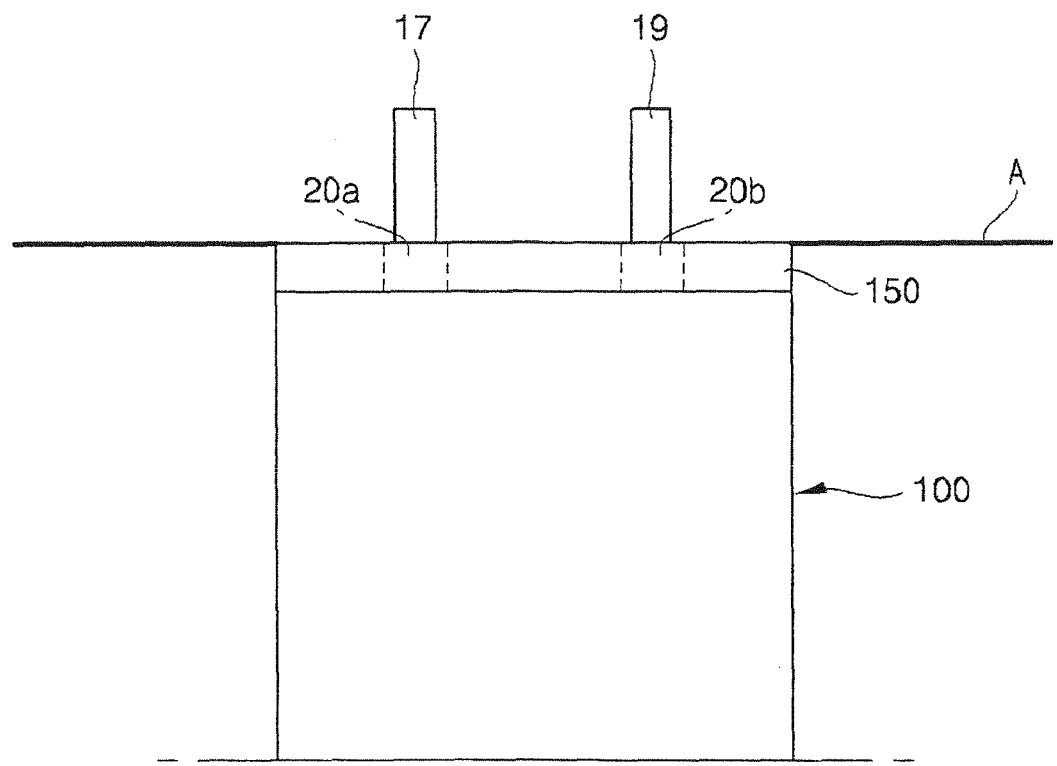
FIG. 2A is a front view of a pouch-type rechargeable battery according to an embodiment of the present invention.
Figure 4:
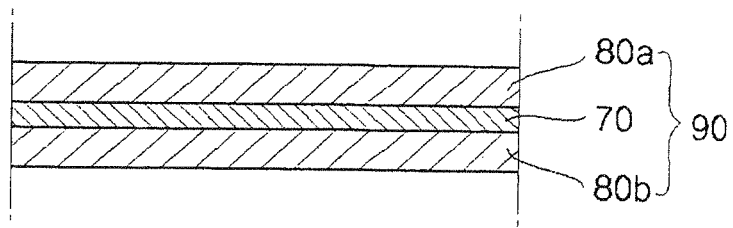
FIG. 4 is a sectional view of the top and bottom of the pouch according to an embodiment of the present invention.

As shown in FIG. 2A, the top 30 and bottom 40 of the pouch forms a sealing part 150 by being heated and pressed in one end of the pouch 100. The two electrode taps 17 and 19 are drawn out of the pouch 100 through the sealing part 150. As shown in FIG. 4, a pouch membrane 90 constituting the pouch includes three layers, a metal foil layer 70, and insulation layers 80a and 80b respectively formed on the top and bottom thereof.

The metal foil layer 70 can be made of aluminum or an alloy of aluminum-based material, and the insulation layers 80a and 80b can be made of the same material, for example, a polyolefin resin layer, CPP (Casted polypropylene). The insulation layer 80a and 80b are can be made of other material which melts ranging from 90° C. to 160° C. so as to facilitate the sealing.

A pouch membrane can be formed with many more functional layers. The insulation layers in the top and bottom surfaces of a metal foil layer can be formed of different materials. For example, the inner layer in the pouch can be made of CPP (Casted polypropylene) and the outer layer thereof can be made of any plastic selected from a group consisting of polypropylene chloride, polyethylene, ethylenepropylene copolymer, copolymer of polyethylene and acrylic acid, and copolymer of polypropylene and acrylic acid.

As the pouch is heated and pressed for sealing, a bottom insulation layer or an inner insulation layer 80b of the pouch membrane in a sealing part 150 are heated and pressed above its melting point. Portions of the inner insulation layer 80b or portions of the resin layers 20a and 20b of the sealing part 150 melt, flow outside the pouch 100, cover one end (hereinafter, referred to as a front end) of the pouch membrane in the front end of the pouch which the straight line A passes, and then is hardened, thereby acting as an insulation membrane covering the metal foil layer 70 exposed in the front end of the pouch. Accordingly, as the electrode taps 17 and 19 are bent in the front end of the pouch, the metal foil layer in the front end of the pouch is covered with the insulation membrane for preventing the electrode taps 17 and 19 and the metal foil layer 70 from being electrically connected to each other.

In forming the sealing part of the pouch, the front ends of the resin layers 20a and 20b do not exceed the straight line A crossing the electrode taps in an approximately longitudinal direction, passing the front end of the pouch or the front end of the sealing part 150, thereby preventing the resin layers 20a and 20b from being exposed outside the pouch. The resin layers 20a and 20b can be projected from their original position by pressure in the process of sealing. Accordingly the electrode taps 17 and 19 can be installed in the sealing part 150 with a smaller width than that of the sealing part 150, in the direction which the electrode taps 17 and 19 are drawn out of the pouch, so that the resin layers 20a and 20b are not exposed outside the pouch 100.

Considering temperature and pressure applied to heat and press the sealing part, the positions of the resin layers 20a and 20b or the optimized width of the sealing part 150 can be decided according to the each condition. In contrast, the temperature and pressure can be adjusted so that the resin layers 20a and 20b are not drawn out of the pouch in the front end of the sealing part 150.

Figure 2B:
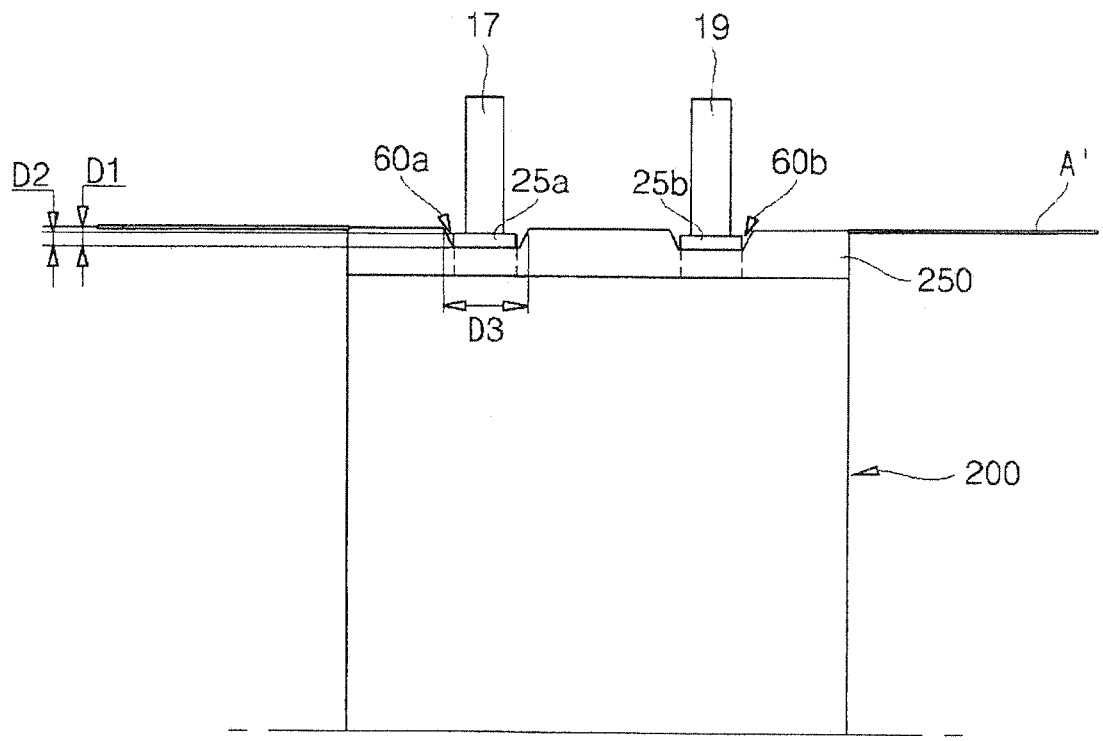
FIG. 2B is a front view of a pouch-type rechargeable battery according to another embodiment of the present invention.

According to another embodiment of the present invention, the sealing part 250 of the pouch 200, as shown FIG. 2B, has groove parts 60a and 60b formed therein, so that the outer line in the front end of the sealing part 250 is curved in the sealing part D3 corresponding to resin layers 25a and 25b. In the groove parts, the electrode taps 17 and 19 are covered with portions of the resin layers 25a and 25b. When the electrode taps 17 and 19 are bent along a virtual straight line A' crossing the front end of the pouch for connecting to a protective circuit board, the groove parts 60a and 60b and portions of the resin layers 25a and 25b exposed outside the pouch prevent the electrode taps 17 and 19 and the metal foil layer of the pouch membrane from being electrically connected to each other.

Other portion except for portions of the resin layers 25a and 25b, which is exposed outside the pouch, exists in the sealing part 250 in the bottoms of the groove parts 60a and 60b. The groove parts 60a and 60b have a height D1 which is greater than the height D2 of the resin layers 20a and 20b exposed to the grooves 60. The groove parts 60a and 60b are sealed, so that the resin layers 25a and 25b do not project to the outside above a virtual straight line A' crossing the front end of the sealing part 250.

Figure 3A:
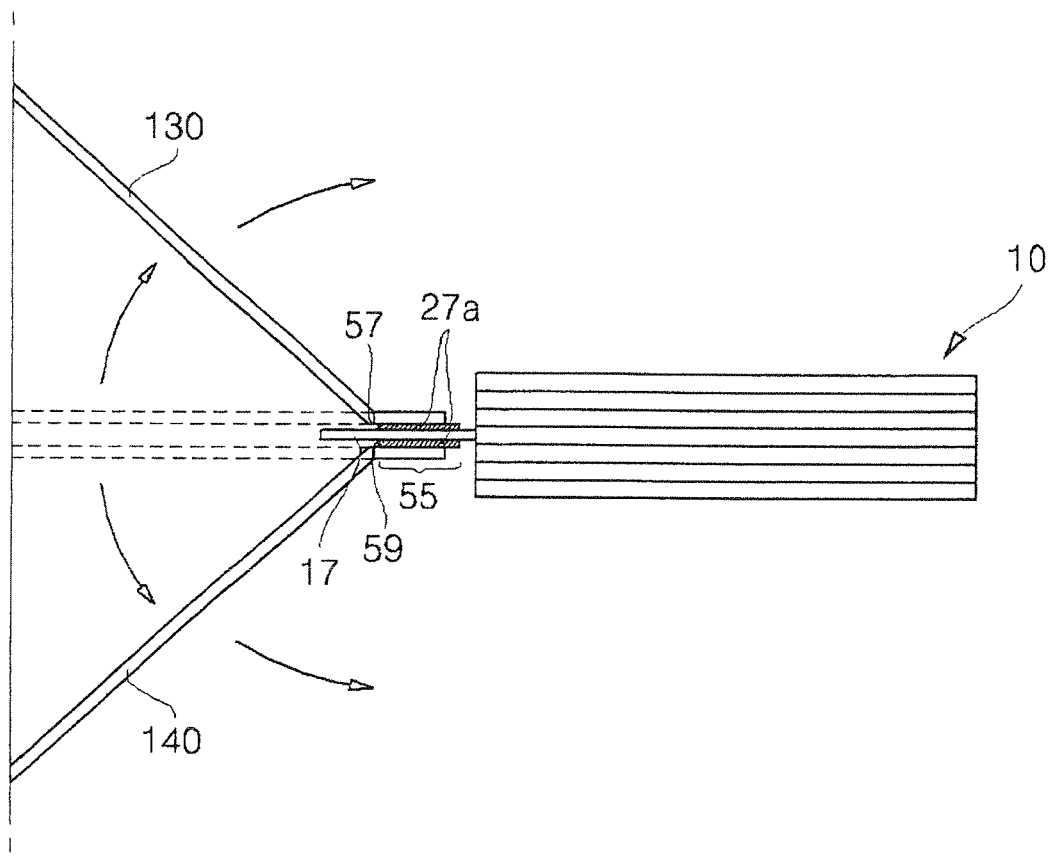
FIGS. 3A and 3B are longitudinal cross-sectional views before and after completing a pouch-type rechargeable battery according to an embodiment of the present invention.
Figure 3B:
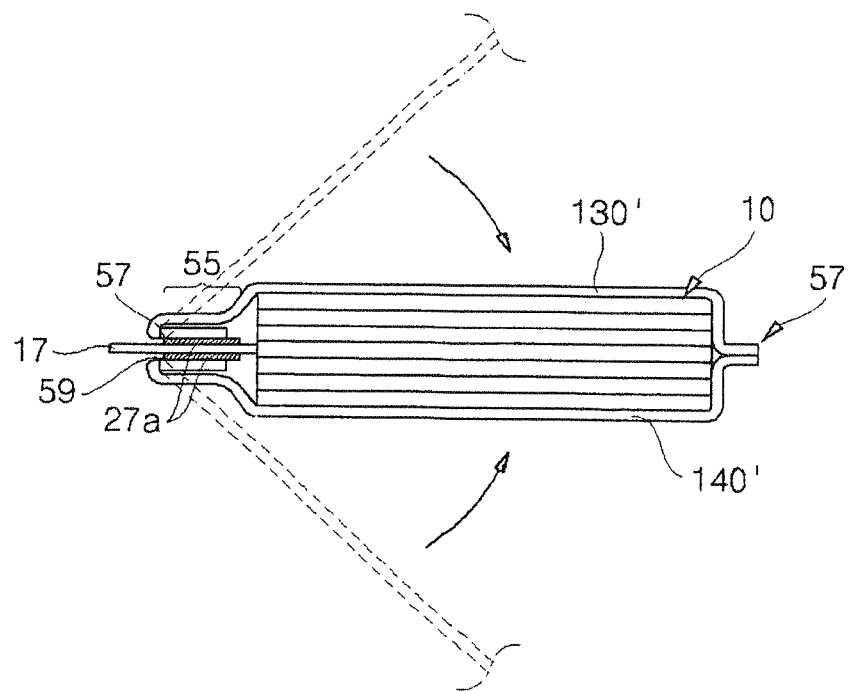

Referring to FIGS. 3A and 3B, the pouch at first is divided into the top and bottom thereof. The ends of the divided top 130 and bottom 140 of the pouch corresponding to the first sealing part 55 are overlapped with the top and bottom of the resin layer 27a covering the top and bottom surfaces of the electrode tap 17. Then, the edges of the ends can be positioned in the middle of the electrode tap covered with the resin layer 27a.

The resin layer 27a is sealed, contacting with the outer insulation layer (corresponding to 80a in FIG. 4) of the pouch membrane. The top 130 and bottom 140 of the pouch are folded along the folding lines 57 and 59 or the first sealing part 55, respectively, to expose the end of the electrode tap 17. The electrode assembly 10, which has been exposed outside the pouch, is covered with the top 130 and bottom 140 of the pouch. Then, the opening edge parts (flange parts) of the top 130' and bottom 140' of the pouch are sealed and form a second sealing part 57, thereby forming a closed pouch-type bare cell.

Accordingly, the outer insulation layer 80a of the pouch membrane is exposed in the outer surface of the pouch-type bare cell. Considering the portion which the first sealing part 55 is formed as the front thereof, and the portion which the second sealing part 57 is formed as the rear thereof, the folding lines 57 and 59 constitute the front end of the pouch including a pouch-type bare cell, and are formed in the further front than the front end of the resin layer 27a. In the pouch-type bare cell, the resin layer 27a is included in the first sealing part 55. Therefore, as the electrode tap 17 is bent along the folding lines 57 and 59 of the top 130' and bottom 140' of the pouch, the substantial bent part of the electrode tap 17 is formed in the further front than the folding lines 57 and 59 due to the resin layer 27a for preventing the pouch-type rechargeable battery from being longer than necessarily.

In addition, when the front end of the pouch membrane is overlapped with the resin layer 27a and the electrode tap 17 is bent in the portions of the folding lines 55 and 59, only the outer insulation layer 80a of the pouch membrane is contacted, so that the electrode tap 17 and the metal foil of the pouch do not contact each other.

Although the pouch is divided into the top 130 and bottom 140 thereof in FIGS. 3A and 3B, the pouch can be a tube-type, not being divided. In this case, the inner side of the tube will be reversed to form the outer side thereof, not that the top and bottom of the pouch are folded along the folded line. Then, the first sealing part and the second sealing part are respectively formed on one end and the other end of the tube to form the pouch.

A method of manufacturing the pouch-type rechargeable battery according to exemplary embodiments of the present invention are described below in more detail with reference to the attached drawings.

Figure 5:
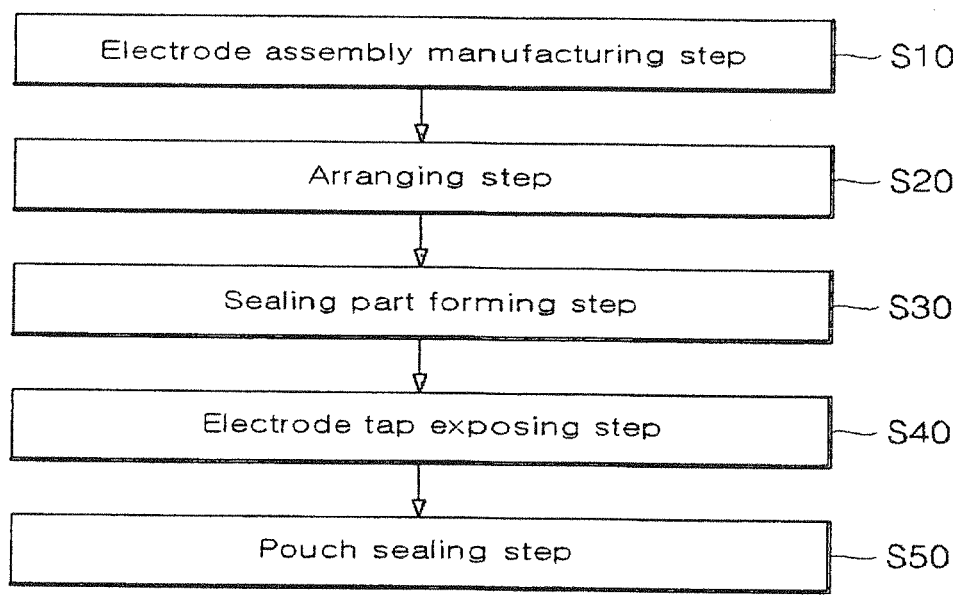
FIG. 5 is a flowchart of a method of manufacturing a pouch-type rechargeable battery according to an embodiment of the present invention.

As shown in FIG. 5, a method of manufacturing the pouch-type rechargeable battery according to exemplary embodiments of the present invention includes: an electrode assembly manufacturing step (S10); an arranging step (S20); a sealing part forming step (S30); an electrode tab exposing step (S40); and a pouch sealing step (S50).

In the electrode assembly manufacturing step (S10), the electrode assembly, which is formed by stacking a positive electrode plate 11 and a negative electrode plate 13, each coated with an electrode active material, and a separator 15 interposed between the plates, is wound in a spiral form. The separator 15 prevents the positive electrode plate 11 and the negative electrode plate 13 from being short-circuited and only allows lithium ions to pass.

In addition, the positive electrode tap 17 and the negative electrode tap 19, drawn out of the positive electrode plate 11 and the negative electrode plate 13, have a resin layer 27a respectively attached to the outer surfaces thereof, for improving adhesion between the top 130 and bottom 140 of the pouch and the electrode tap.

The positive electrode active materials may be chalcogenide compounds, e.g., metallic oxide compounds, such as $LiCoO_2$, $LiMn_2O_4$, $LiNiO_2$, $LiNi1-xCoxO_2$ $(0<x<1)$, $LiMnO_2$, and the like. The negative electrode active materials may be selected from a group consisting of carbon-based materials, Si, Sn, tin oxides, composite tin alloys, transition metal oxides, or lithium metallic oxides. In addition, the positive electrode plate 11 is made of an aluminum material, and the negative electrode plate 13 is made of a copper material. The separator 15 is usually made of polyethylene or polypropylene.

In the arranging step (S20), the position of the resin layer 27a and a first sealing part 55 are arranged. As shown in FIG. 3B, the first sealing part 55 formed on ends of the top 130 and bottom 140 of the pouch includes the resin layer 27a of the electrode tap 17, which is positioned between the top and bottom of the pouch. It is preferred that edges of the top 130 and bottom 140 of the pouch do not exceed a portion of the resin layer 27a of the electrode tap 17.

The top 130 and bottom 140 of the pouch is arranged in the opposite direction to the electrode assembly 10 along the sealing part. The top 30 and bottom 40 of the pouch is arranged upwards and downwards, respectively, on the axis of the electrode tap covered with the resin layers 20a and 20b. Outer insulation layers of the pouch membrane forming outer surfaces of the pouch are opposed to each other.

In the sealing part forming step (S30), the sealing part are heated and pressed to weld the contacted surfaces between the outer insulation layer of the pouch membrane of the sealing part and the resin layer 27a.

In the electrode tap exposing step (S40), as shown FIGS. 3A and 3B, the top 130 and bottom 140 of the pouch are folded and bent toward the electrode assembly 10 on the axis of the first sealing part 55 (more concretely, along the folding lines 57 and 59). This exposes one end of the electrode tap 17 in the front of the resin layer 27a covered with the top 130 and bottom 140 of the pouch. The resin layer 27a is formed in the rear thereof along of the folding lines 57 and 59, to be covered with the top 130' and bottom 140' of the pouch like an electrode assembly 10, and expose the outer insulation layer of the pouch membrane outside the pouch.

In the pouch sealing step (S50), the top 130' and bottom 140' of the pouch are joined as opposed to each other, housing the electrode assembly 10 inside the pouch, to seal the inner insulation layer of the pouch membrane which is opposed on the flange part thereof. Thus, a pouch-type rechargeable battery, in which the resin layer 27a is formed inside the pouch, is formed.

In summary, the pouch-type rechargeable battery according to the present invention is adapted to seal the resin layer attached to the electrode tap of the battery in the sealing part or inside the pouch, instead of exposing it outside the sealing part so as to substantially reduce the length of the battery, thereby improving the capacity-to-volume ratio of the battery.

While the present invention has been particularly shown and described with reference to exemplary embodiments thereof, it will be understood by those skilled in the art that various modifications in form and detail may be made therein without departing from the spirit and scope of the present invention as defined by the appended claims. Therefore, the scope of the present invention is defined by the appended claims, and all differences within the scope will be construed as being included in the present invention.

What is claimed is:

1. A pouch-type rechargeable battery comprising:
an electrode assembly including a resin layer arranged on a portion of a surface of an electrode tab; and
a pouch having a front and a rear end on opposite ends of the pouch, said pouch including the electrode tab drawn through a sealing part of the pouch arranged across an entirety of the front end of the pouch formed by the opposite sides joining together at the front end,
said resin layer being confined within said sealing part and interposed between the surface of the electrode tab and the opposite sides of the pouch that meet together to form said sealing part;
said sealing part of said pouch including a groove located on a surface of the front end of the pouch, said groove forming an indentation in the surface of the front end of the pouch around the electrode tab and below said opposite sides, wherein the indentation of the groove has a curved shape with a convex curvature of the groove bent toward the rear end of the pouch where the electrode assembly is housed.

2. The pouch-type rechargeable battery of claim 1, wherein the sealing region formed by joinder of the opposite sides along an entirety of the front end of the pouch defines a flange, and the groove is set apart from a terminal edge of a flange by a distance that is greater than that of an exposed portion of the resin layer.

3. The pouch-type rechargeable battery according to claim 1, wherein a distance in which the groove is set apart from a terminal edge of the front end is greater than that of an exposed portion of the resin layer.

4. The pouch-type rechargeable battery according to claim 1, wherein a front end of a pouch membrane, on a part in which the electrode tap is drawn out, is folded inside the pouch along a folding line to seal opposite sides of ends of the folded pouch membrane.

5. The pouch-type rechargeable battery according to claim 4, wherein the pouch membrane comprises an insulation layer covering upper and lower surfaces of a metal foil layer.

6. The pouch-type rechargeable battery according to claim 5, wherein the insulation layer has a melting point in a range of from 90° C. to 160° C.

7. The pouch-type rechargeable battery according to claim 5, wherein the insulation layer comprises a polyolefin resin layer, CPP (Casted Polypropylene).

8. A pouch-type rechargeable battery, comprising:
an electrode assembly including a resin layer arranged on a surface portion of an electrode tab; and
a pouch having a front and rear end on opposite ends of the pouch, the resin layer being a portion of a sealing region formed by joinder of the opposite sides along an entirety of the front end of the pouch, the pouch accommodating passage of the electrode tab drawn through the sealing region, said resin layer being a portion of said sealing region confined to terminate within said sealing region and not beyond said front end;
said sealing region of said pouch including a groove forming an indentation in the joinder of the opposite sides around the electrode tab, the indentation of the groove having a curved shape with a convex curvature of the groove bent toward the rear end of the pouch.

9. The pouch-type rechargeable battery of claim 8, wherein the top and bottom of the pouch establishes the width of the sealing region so that the sealing region covers an edge of the end of the electrode tab of the resin layer upon forming the sealing region.

10. The pouch-type rechargeable battery of claim 8, wherein the sealing region formed by joinder of the opposite ends along an entirety of the front end of the pouch defines a flange, and the groove is set apart from a terminal edge of a flange by a distance that is greater than that of the exposed portion of the resin layer.

* * * * *